(12) United States Patent
Yamamoto et al.

(10) Patent No.: US 8,879,788 B2
(45) Date of Patent: Nov. 4, 2014

(54) VIDEO PROCESSING APPARATUS, METHOD AND SYSTEM

(75) Inventors: Koji Yamamoto, Tokyo (JP); Makoto Hirohata, Kawasaki (JP)

(73) Assignee: Kabushiki, Kaisha Toshiba, Minato-ku, Tokyo (JP)

( * ) Notice: Subject to any disclaimer, the term of this patent is extended or adjusted under 35 U.S.C. 154(b) by 314 days.

(21) Appl. No.: 13/240,278

(22) Filed: Sep. 22, 2011

(65) Prior Publication Data

US 2012/0076357 A1 Mar. 29, 2012

(30) Foreign Application Priority Data

Sep. 24, 2010 (JP) ................................ 2010-214478

(51) Int. Cl.
*G06K 9/00* (2006.01)
*H04N 21/233* (2011.01)
*H04N 21/8549* (2011.01)
*H04N 21/234* (2011.01)
*H04N 21/25* (2011.01)
*H04N 21/258* (2011.01)
*H04N 21/845* (2011.01)

(52) U.S. Cl.
CPC ......... *H04N 21/233* (2013.01); *H04N 21/8549* (2013.01); *H04N 21/23418* (2013.01); *H04N 21/252* (2013.01); *G06K 9/00711* (2013.01); *H04N 21/25891* (2013.01); *H04N 21/8456* (2013.01)
USPC ........................................................ 382/103

(58) Field of Classification Search
None
See application file for complete search history.

(56) References Cited

U.S. PATENT DOCUMENTS

| | | | | |
|---|---|---|---|---|
| 6,744,922 B1 * | 6/2004 | Walker | ......................... | 382/190 |
| 7,327,885 B2 * | 2/2008 | Divakaran et al. | ............. | 382/190 |
| 2004/0268380 A1 * | 12/2004 | Divakaran et al. | .............. | 725/19 |
| 2005/0089224 A1 * | 4/2005 | Aoki | ............................ | 382/173 |
| 2007/0010998 A1 * | 1/2007 | Radhakrishnan et al. | .... | 704/211 |
| 2008/0215324 A1 | 9/2008 | Hirohata | | |
| 2008/0310725 A1 * | 12/2008 | Kurata et al. | ................. | 382/190 |
| 2008/0312926 A1 * | 12/2008 | Vair et al. | ...................... | 704/249 |
| 2009/0067807 A1 * | 3/2009 | Hirohata et al. | ................ | 386/52 |

FOREIGN PATENT DOCUMENTS

JP 2008-312061 A 12/2008

\* cited by examiner

*Primary Examiner* — Nancy Bitar
(74) *Attorney, Agent, or Firm* — Ohlandt, Greeley, Ruggiero & Perle, L.L.P.

(57) ABSTRACT

According to one embodiment, a video processing apparatus includes an acquisition unit, a first extraction unit, a generation unit, a second extraction unit, a computation unit and a selection unit. The acquisition unit is configured to acquire video streams. A first extraction unit is configured to analyze at least one of the moving pictures and the sounds for each video stream and to extract feature values. A generation unit is configured to generate segments by dividing each video stream, and to generate associated segment groups. A second extraction unit is configured to extract the associated segment groups that number of associated segments is greater than or equal to threshold as common video segment groups. A computation unit is configured to compute summarization score. A selection unit is configured to select segments used for a summarized video as summarization segments from the common video segment groups based on the summarization score.

9 Claims, 12 Drawing Sheets

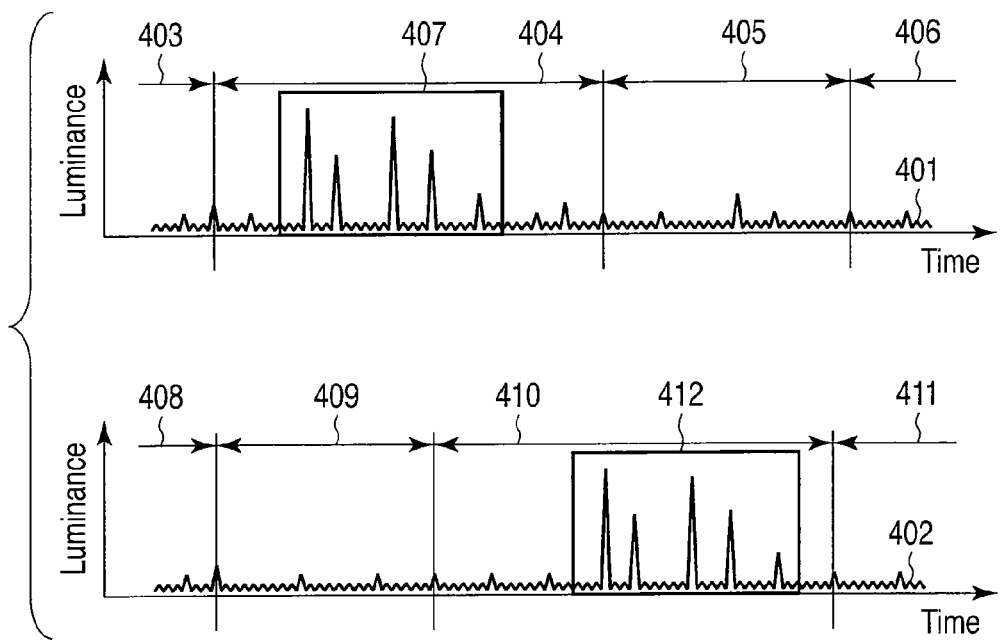
F I G. 4
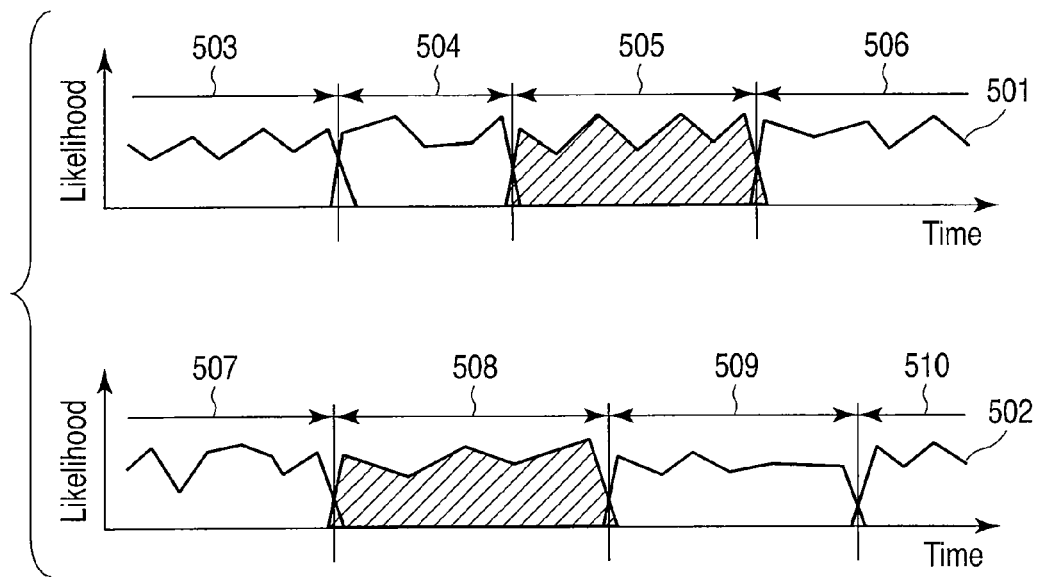
F I G. 5

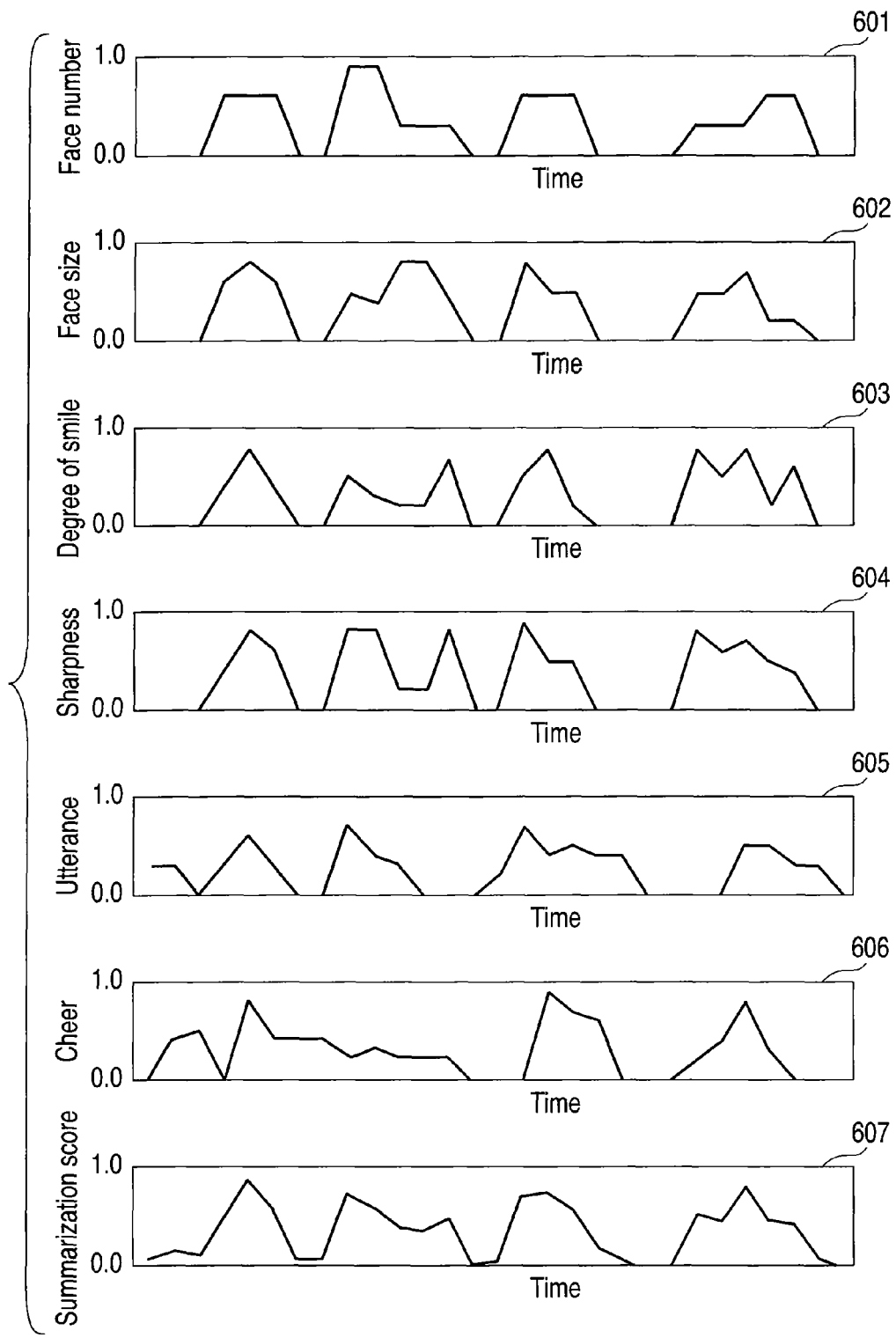
F I G. 6

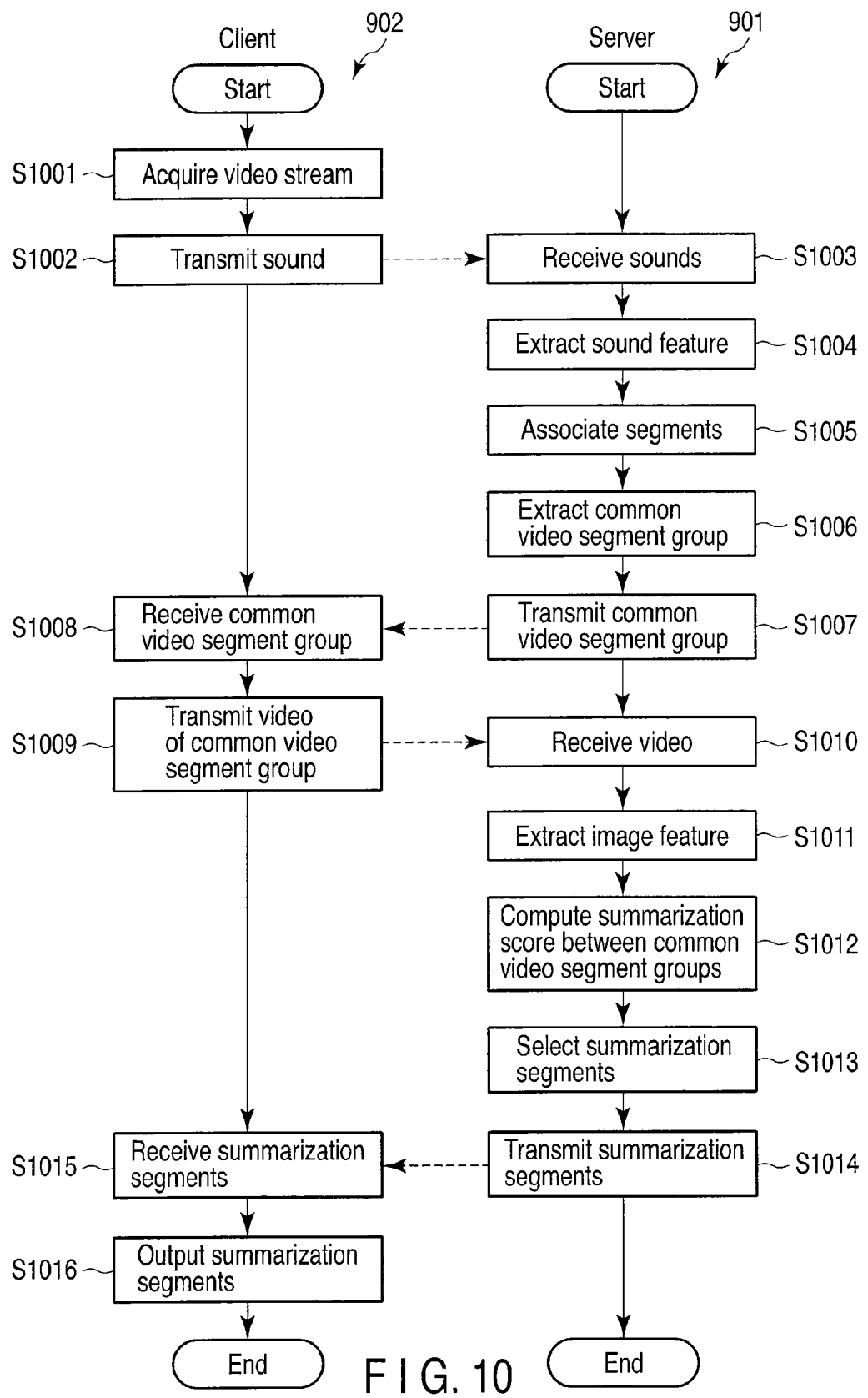
F I G. 10

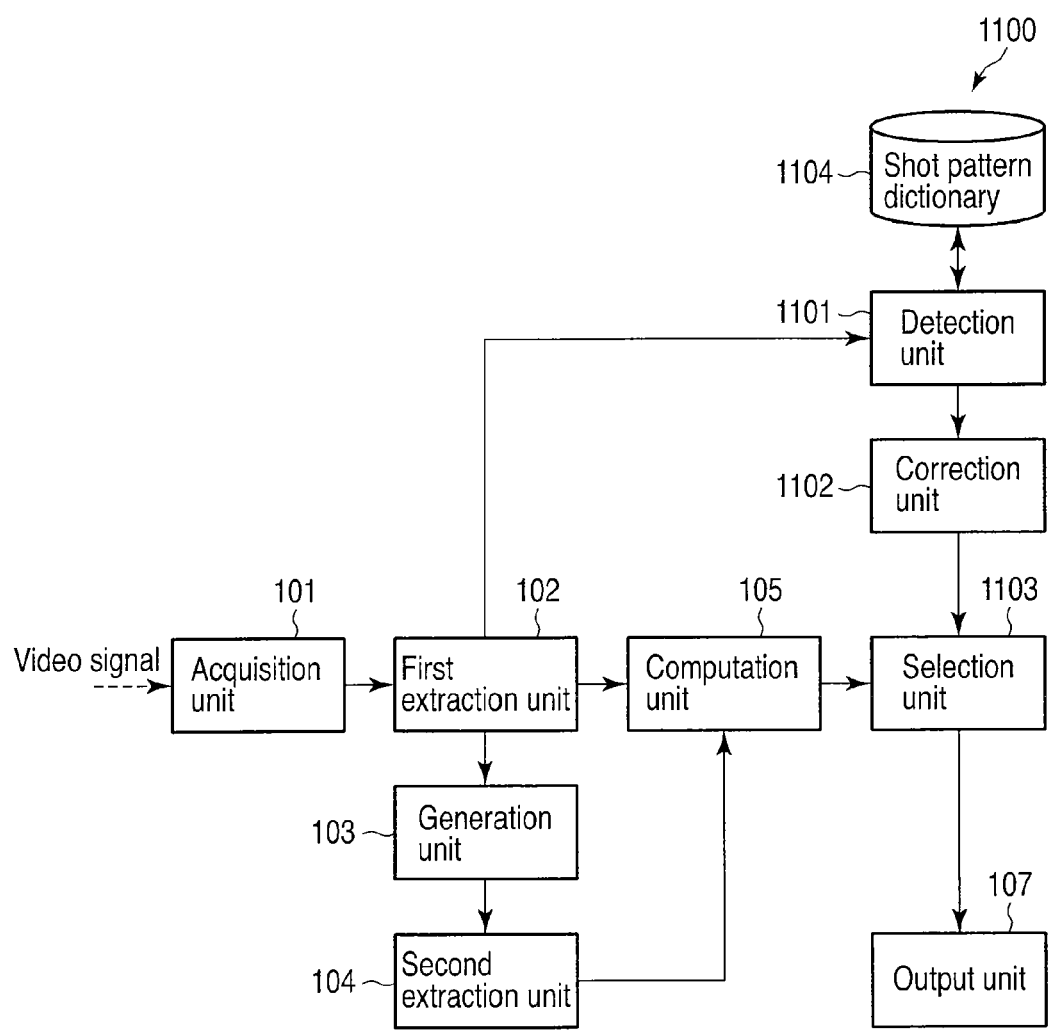
F I G. 11

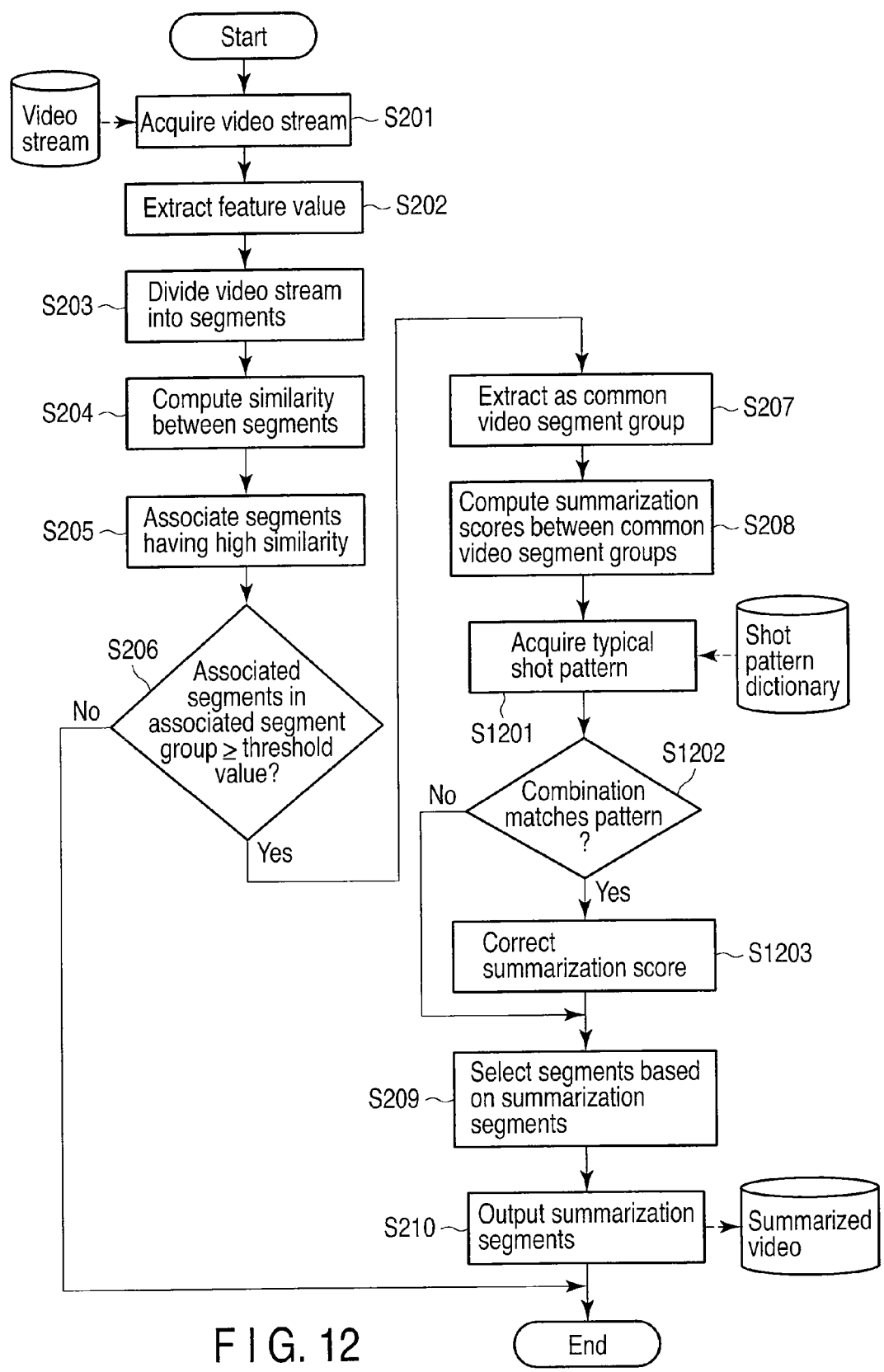
F I G. 12

| Characteristics | Shot 1 | Shot 2 |
|---|---|---|
| Face count | One | 5 or more |
| Face position | Center | Spread |
| Face size | Large | Small |
| Camera angle | Fixed | Pan |
| Sound type | Speech model | Applause model |

US 8,879,788 B2

VIDEO PROCESSING APPARATUS, METHOD AND SYSTEM

CROSS-REFERENCE TO RELATED APPLICATIONS

This application is based upon and claims the benefit of priority from prior Japanese Patent Application No. 2010-214478, filed Sep. 24, 2010, the entire contents of which are incorporated herein by reference.

FIELD

Embodiments described herein relate generally to a video processing apparatus, method and system.

BACKGROUND

A technique for displaying video images of a particular event captured by a plurality of imaging devices currently exists.

BRIEF DESCRIPTION OF THE DRAWINGS

FIG. 4 is an exemplary flowchart illustrating the operation of the generation unit.

FIG. 5 illustrates an example of creating associated segments based on a statistical model.

FIG. 6 illustrates an example of the computational method of summarization scores at the summarization score computation unit.

FIG. 10 is an exemplary flowchart illustrating the operation of the video processing system according to the second embodiment.

FIG. 11 is an exemplary block diagram illustrating a video processing apparatus according to the third embodiment.

FIG. 12 is an exemplary flowchart illustrating the operation of the video processing apparatus according to the third embodiment.

DETAILED DESCRIPTION

Figure 1:
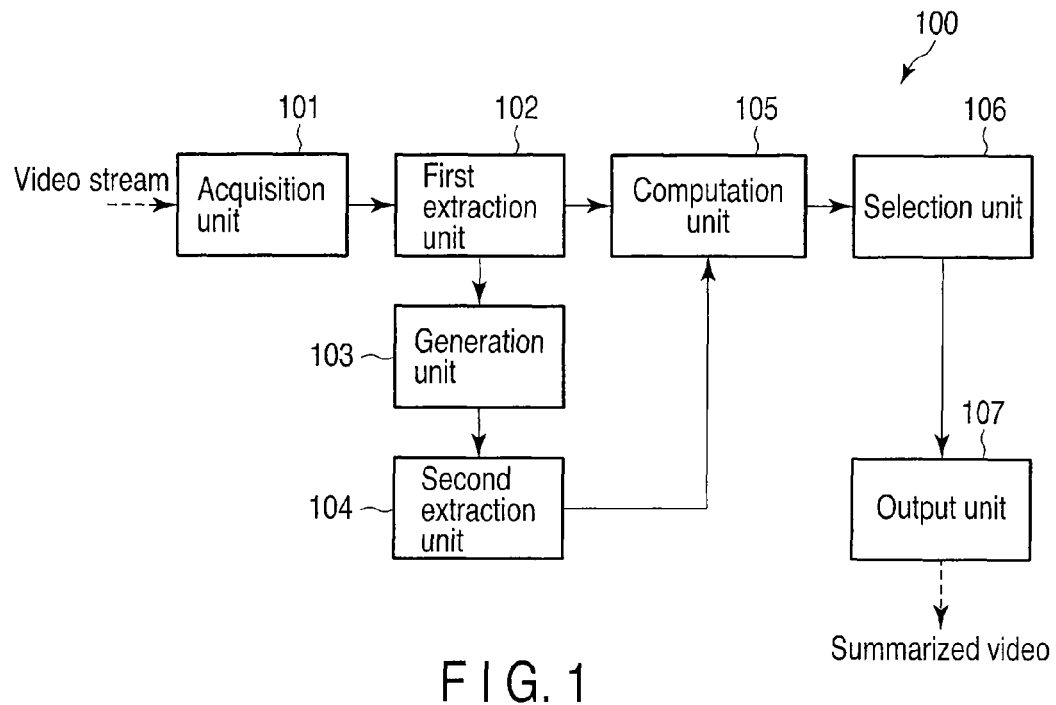
FIG. 1 is an exemplary block diagram illustrating a video processing apparatus according to the first embodiment.

A method of showing video clips of a particular event recorded by a plurality of video cameras exists. However, because it is only possible to associate the plurality of video clips with one another according to the time the clips were recorded, clips that lack timestamps cannot be associated. In addition, if videos had the timestamps, the videos captured at the same time, though taken coincidentally, may be determined as representing an important scene; however, such images may not be important to a user or to viewers.

In general, according to one embodiment, a video processing apparatus includes an acquisition unit, a first extraction unit, a generation unit, a second extraction unit, a computation unit and a selection unit. An acquisition unit is configured to acquire a plurality of video streams each including moving picture data items and sound data items. A first extraction unit is configured to analyze at least one of the moving picture data items and the sound data items for each video stream, and to extract a feature value from the analyzed one, the feature value indicating a common feature between the plurality of video streams. A generation unit is configured to generate a plurality of segments by dividing each of the video streams in accordance with change in the feature value, and to generate associated segment groups by associating a plurality of segments between different video streams, each associated segment included in the associated segment groups having a similarity of feature value between the segments greater than or equal to a first threshold value. A second extraction unit is configured to extract, from the associated segment groups, one or more common video segment groups in which number of associated segments is greater than or equal to a second threshold value, the number of the associated segments being number of different video streams each including the associated segment which corresponds each of the associated segment groups. A computation unit is configured to compute a summarization score indicating a degree of suitability for including a segment of the common video segment group in a summarized video created from a part of the video streams, the summarization score varying with time and being based on the feature value extracted at least one of the moving picture data items and the sound data items. A selection unit is configured to select summarization segments to be used for the summarized video from the common video segment groups based on the summarization score.

At an event where a large number of people are gathered, such as a wedding or school sports day, it is usual for many amateur videographers (e.g., father, mother and so on) to shoot videos of the event. However, such amateur videos may include unnecessary scenes or botched shots; and unless the videos are edited, they will be boring and time-consuming to watch.

Broadcast-class video summarization techniques allow key segments of a video to be automatically extracted to produce a condensed version of the video. However, many of these techniques, since they are for broadcast-quality material recorded and edited by professionals, are not suitable for amateur videos. This is because broadcast material has a definite structure and omits unnecessary scenes, whereas amateur videos lack such structure and contain such unnecessary scenes. Thus, for amateur video content, summarization that differs from that used for broadcast-quality material is required.

In general, an online storage or video posting website allows videos made by many different videographers to be shared. However, videos uploaded to the site over a network are usually re-encoded to reduce the volume of data stored and to enhance usability. In such re-encoding, metadata, including timestamps, is discarded and so videos cannot be associated with one another.

In the following, the video processing apparatus, method and system according to the present embodiments will be described in details with reference to the drawings. In the embodiments described below, elements specified by the same reference number carry out the same operation, and a repetitive description of such elements will be omitted.

(First Embodiment)

A description of the video processing apparatus according to the first embodiment with reference to FIG. 1 follows.

A video processing apparatus 100 according to the first embodiment includes an acquisition unit 101, a first extraction unit 102, a generation unit 103, a second extraction unit 104, a computation unit 105, a selection unit 106 and an output unit 107.

The acquisition unit 101 receives from an external device a plurality of video streams each of which includes moving picture data items and sound data items.

The first extraction unit 102 receives a plurality of video streams from the acquisition unit 101 and, sampling the video streams according to a predetermined period, which may be a fixed interval or a fixed number of frames, extracts from each video stream a series of feature values. The feature values represent features of the video stream and indicate common features between a plurality of video streams. Each of the feature values quantifies an image feature or a sound feature of the stream. The image feature indicates value of characteristics of video stream that extract from moving picture data items. The sound feature indicates value of characteristics of video stream that extract from sound data items. The feature values to be extracted may be either the image feature or the sound feature, and may be both the image feature and the sound feature.

For encoded streams, for example, a Moving Picture Experts Group (MPEG) stream, only I-pictures may be used in extracting feature values, not P-picture or B-picture, where an I-picture is an intra-frame prediction scheme, and P-picture and B-picture are an inter-frame prediction scheme. This allows faster processing because only I-frames need be decoded, whereas with P- or B-pictures, not only would P- or B-frames have to be decoded, but also associated frames.

An image feature can be a low-level feature, such as color or luminance, which does not require picture analysis; a medium-level feature, such as an edge, frequency component, motion vector or local feature, obtained by relatively simple analysis; or a high-level feature, such as facial data obtained by face detection, involving a combination of several kinds of analysis. An image feature may also be a statistic such as a color histogram.

Similarly, a sound feature can be a low-level feature such as volume or a frequency component, or a high-level feature obtained by combining various recognition techniques. High-level features include features, such as text data obtained by speech recognition, sound types such as human voice and music, and speaker identification and classification results.

If the input video stream is in an encoded format such as MPEG, the encoded data may be used. If the encoded data represents moving picture data items, DC component information, motion vector information, and code length can be feature values; if the encoded data represents audio, the feature values can be extracted without decoding the frequency data or the like.

The generation unit 103 receives the feature values from the first extraction unit 102, and divides each video stream into a plurality of segments at points where the feature values extracted for each period change considerably. Then, the generation unit 103 compares the feature values for the segments of different video streams and computes similarity. If the segments have a similarity greater than or equal to a threshold value, they are associated with one another as associated segments.

The second extraction unit 104 receives associated segment groups from the generation unit 103, and determines whether or not the number of associated segments for each group is greater than or equal to a threshold value. If the number of associated segments is greater than or equal to the threshold value, the group is extracted as a common video segment group.

The computation unit 105 receives the feature values from the first extraction unit 102 and the common video segment groups from the second extraction unit 104, and computes summarization scores of the feature values included in each common video segment group for each predetermined period. The summarization scores are computed by using, for example, the size or number of faces in a scene, the degree of a smile, and sharpness. The summarization scores indicate the degree of suitability to be included in the summarized video.

The selection unit 106 receives the common video segment groups and the corresponding summarization scores from the computation unit 105, and selects summarization segments which are to be used in the summarized video from each common video segment group on the basis of the summarization scores.

The output unit 107 receives the summarization segments from the selection unit 106, and outputs the summarization segments. The output summarization segments may be only information indicating a video and corresponding segments to be included in the summarized video, or the summarized video itself in which videos of the summarization segments are combined.

Figure 2:
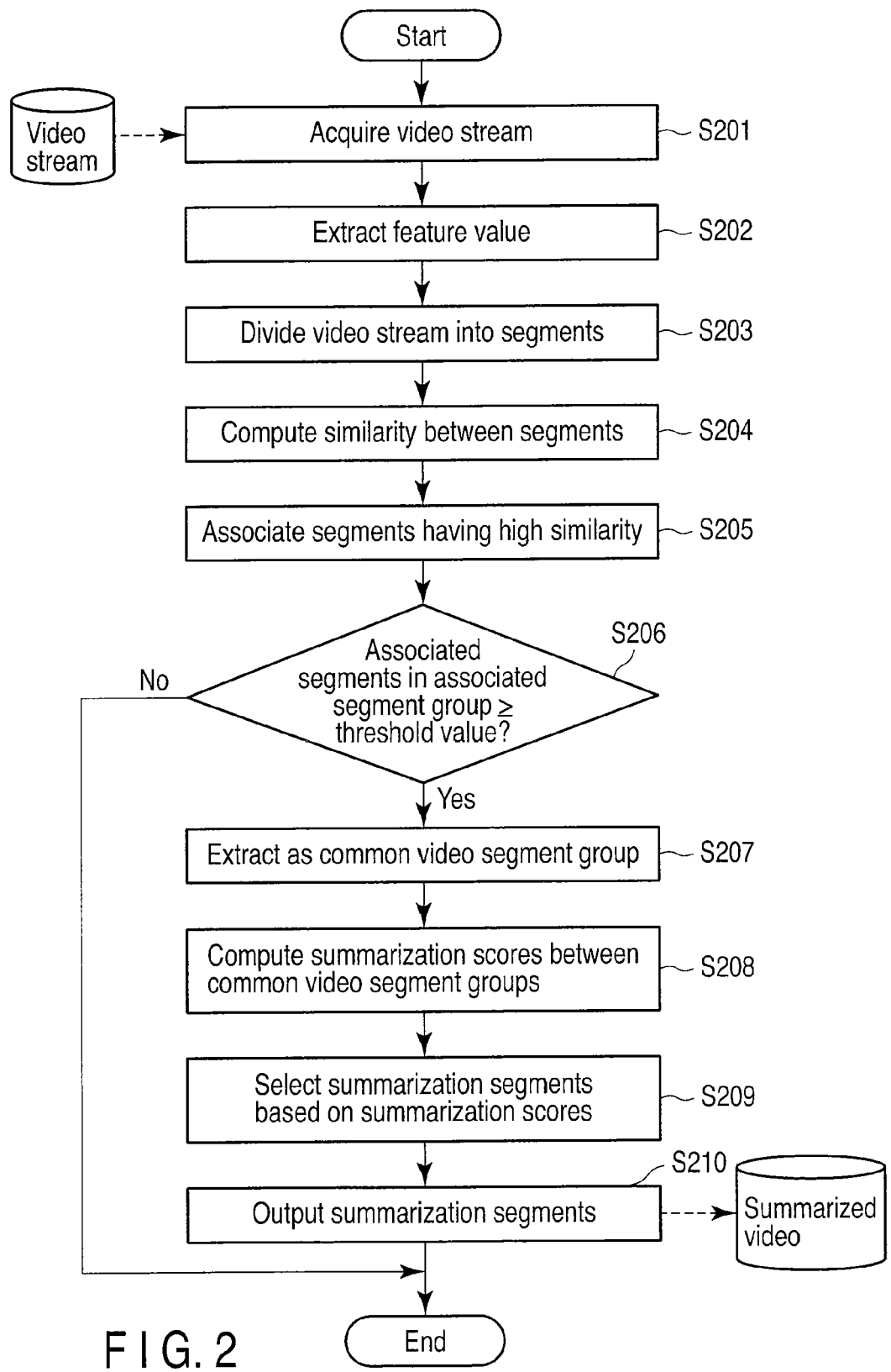
FIG. 2 is an exemplary flowchart illustrating the operation of the video processing apparatus according to the first embodiment.

The operation of the video processing apparatus 100 according to this embodiment will be explained with reference to the flowchart shown in FIG. 2.

In step S201, the acquisition unit 101 receives a plurality of video streams from an external device.

In step S202, the first extraction unit 102 extracts the feature values of video streams in accordance with a predetermined period.

In step S203, the generation unit 103 divides each video stream into a plurality of segments at points where the feature value extracted for each predetermined period changes considerably. For example, a distance is measured by comparing color histogram for each frame, and video stream is divided between frames at which the difference in distance is large. The distance is obtained by computing the absolute value of the frequency difference for each bin of histogram and adding all absolute values. If the video stream is not divided, step S203 is skipped.

In step S204, the generation unit 103 computes similarities by comparing feature values of the plurality of segments. The feature values of segments are represented, for example, by the mean value or parameters of models created based on distribution, of feature values obtained at different time within a segment.

In step S205, the generation unit 103 generates associated segment groups by associating segments of different video streams whose similarities are greater than or equal to a threshold value.

In step S206, the second extraction unit 104 determines whether or not the number of segments included in each associated segment group is greater than or equal to a threshold value. If the number of segments is greater than or equal to the threshold value, the process proceeds to step S207; if not, the process is finished.

In step S207, the second extraction unit 104 extracts the associated segment groups which include the threshold value or more segments as common video segment groups since such segments are inferred as including important scenes of an event.

In step S208, the computation unit 105 computes a summarization score for each segment included in the common video segment groups according to the predetermined period by using the feature values. The predetermined period may be not only the above-mentioned fixed interval or fixed number of frames, but also a certain segment which is not a fixed interval.

In step S209, the selection unit 106 selects summarization segments from each common video segment group based on the summarization scores. The segments within the common video segment group having the highest summarization scores or having scores greater than or equal to a threshold value are selected as the summarization segments.

In step S210, the output unit 107 outputs the summarization segments.

The segment association will be explained with reference to FIG. 3.

Figure 3:
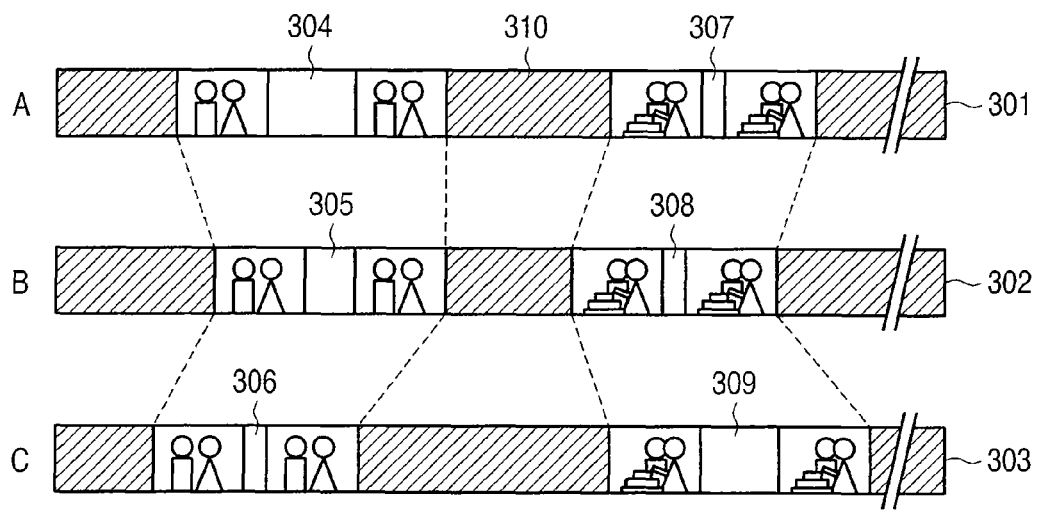
FIG. 3 illustrates an example of implementing segment association according to the first embodiment.

FIG. 3 shows input video streams 301, 302 and 303 captured by video cameras A, B and C. It is assumed that the video streams were shot at a wedding ceremony. Segments 304 to 306 show a scene of the bride and groom's entrance, and the first and last images in the sequence are shown as thumbnails. Segments 307 to 309 show a scene of the cake being cut by the bride and groom, and the first and last images in the sequence are shown as thumbnails. The scenes of the bride and groom's entrance and the cutting of the cake are important in the event, and they are captured by all cameras A, B and C. The shaded segments 310 are unimportant scenes of the event. Segments 310 include video streams captured by three different cameras, and segments 310 of video streams 301, 302 and 303 have different images. The generation unit 103 associates segments 304, 305 and 306, and segments 307, 308 and 309 which are considered as important since they are shot by several cameras. As a result, the segments 304, 305 and 306, and the segments 307, 308 and 309 are called as associated segment groups, respectively.

The segment association in the generation unit 103 will be explained with reference to FIG. 4, in detail.

The feature values 401 and 402 are luminance values extracted from video streams shot by different cameras. For example, herein, the luminance value is the mean value of luminance of the whole screen, but the luminance value may be calculated by any calculation procedures. Segments 403 to 406 and 408 to 411 are divided based on feature values other than the luminance value (for example, sound feature).

Since segments 404 and 410 show a high similarity, these segments are extracted as an associated segment group indicating the same scene. The similarity is obtained, for example, by using cross-correlation. The associated segment groups can also be generated by the above process based on the sound level instead of the luminance value.

The segment association can be realized based on a flash as well. For example, section 407 and section 412 show a high level luminance because of the use of flash. If an associated segment group is an important scene, the luminance shows the pattern as in the sections 407 and 412 since many flashes are used when shooting the scene. Based on this, if the luminance is greater than or equal to a threshold value, the luminance is determined to be a flash, and segments in which flashes are synchronized are associated with each other as the associated segment group. For association of segments by use of flash, cross-correlation by a function where "1" represents use of flash and "0" represents non-use of flash is used. For scenes shot without flash, segments are associated by using another feature value such as a sound feature. If searching segments to be associated based on the cross-correlation takes long time, a faster search is realized by representing the feature values of segments to be compared by histogram and comparing the histograms.

The segment association can also be realized based on a certain statistical model.

FIG. 5 illustrates an example of segment association based on a statistical model.

Graphs 501 and 502 show the likelihood of sound models which are the closest to the feature values extracted from video streams captured by different cameras. The sound models are created by calculating the mel frequency cepstral coefficient (MFCC) based on the frequency components of sound, and describing the distribution by a Gaussian mixture model (GMM). A plurality of sound models are created from sound data items. The sound models can be a conversation model, an applause model, a cheer model prepared in advance, or can be prepared by clustering sound data items while shooting.

The sound data item of each segment is compared with the sound models, and the model is determined based on the highest likelihood within a segment.

Sound models can be used for dividing video streams into segments. For segments 503 to 506 and segments 507 to 510, the sound models are switched at the divided point between segments 503 and 504, for example. If shaded segments 505 and 508 have the same sound model, these segments are estimated to represent the same scene, and they are associated with each other. Even if a voice and a background sound are superposed, scenes having the high similarity of background sound are estimated to be the same scene because the mixture model by GMM is used. This realizes segment association without being affected by sounds other than background sound.

Next, an example of the computation method of the summarization score by the computation unit 105 is given with reference to FIG. 6.

Scores 601 to 606 indicate the time change of scores of feature elements extracted from video streams such as the number of faces, the size of a face, the degree of a smile, sharpness, utterance, and cheering. The scores vary zero to one. The summarization score 607 is a value obtained by adding the scores of all elements and normalizing the added score. When adding the scores, the scores may be weighted in accordance with the importance of an element. For example, if a specific person is important in an event, the score of the size of face or utterance is weighted to be a high score, and the score of cheering is weighted to be low. In this example, the summarization scores are computed from a plurality of elements. However, the summarization scores may be computed from one element if the score varies over time. The number of elements used for summarization score computation may be reduced for computation cost reduction. The change of score may be based on the frames of video, for example, the numbers added to video (frame numbers).

There is a case where the main characters of an event such as the bride and groom in the wedding ceremony should be mainly shown in the summarized video. For such a case, people are classified by clustering based on the feature values of faces obtained by the face detection, the main characters are determined based on the cluster element value (herein, the result of clustering), and high scores can be assigned to the main characters.

Figure 7:
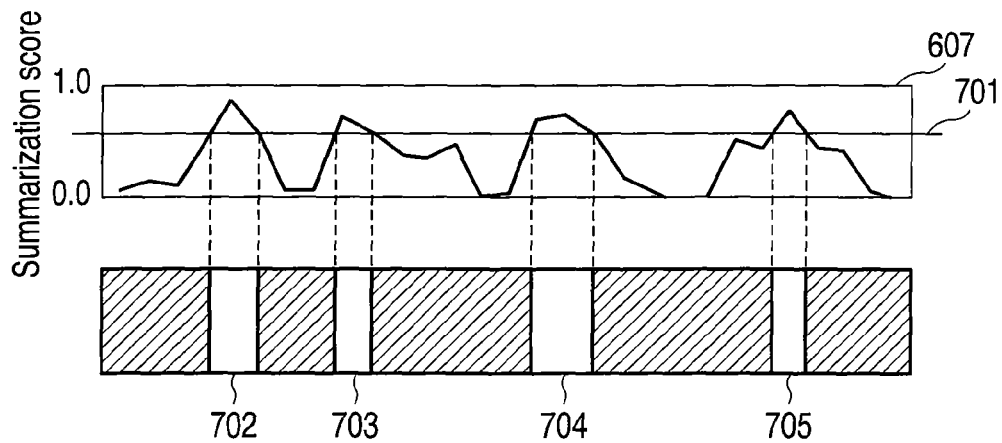
FIG. 7 illustrates an example of the selection method of summarization segments at the selection unit.

A method of selecting summarization segments by the selection unit 106 will be described with reference to FIGS. 7 and 8. FIG. 7 shows a case where segments having summarization scores greater than or equal to a threshold value are selected as summarization segments, and FIG. 8 shows a case where segments having the highest summarization scores are selected as summarization segments.

FIG. 7 shows a method for selecting summarization segments from a video stream. First, a threshold value 701 is set relative to a summarization score 607, and segments 702 to 705 in which the summarization scores exceed the threshold value 701 are selected as summarization segments. The threshold value 701 may be preset, or may be set to be a total number of summarization segments or a total time of summarization segments.

Figure 8:
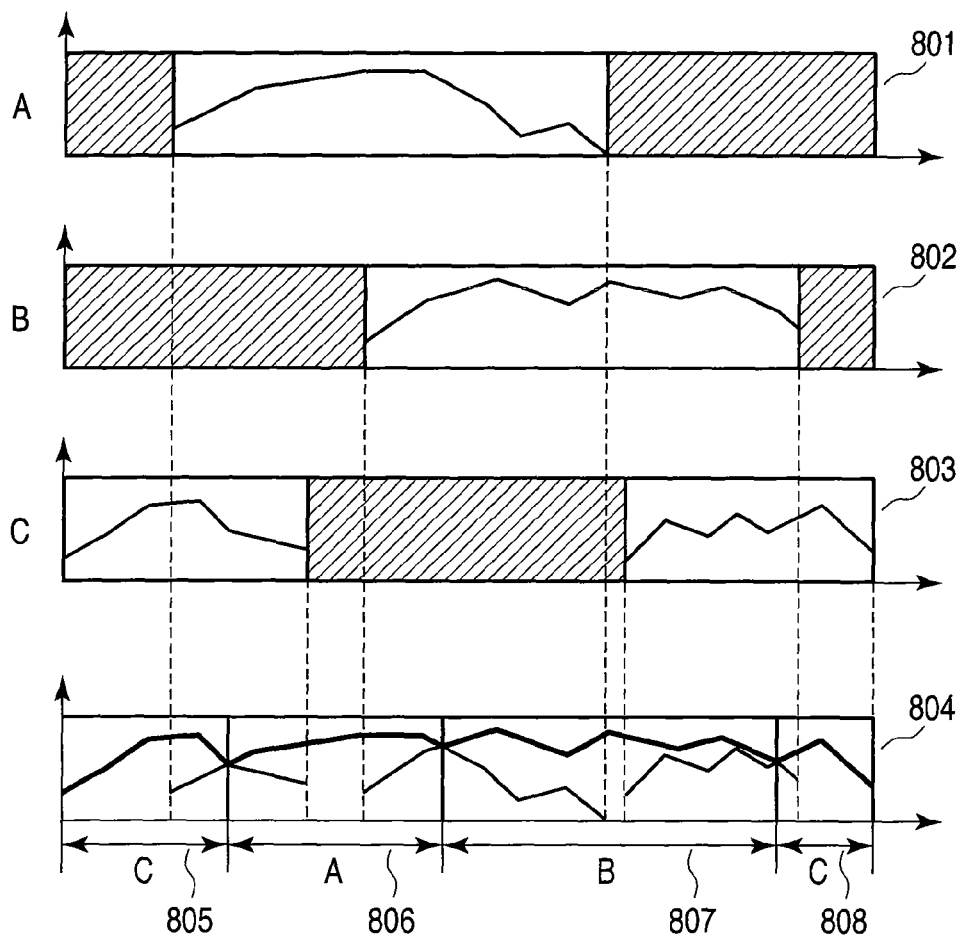
FIG. 8 illustrates another example of the selection method of summarization segments at the selection unit.

As shown in FIG. 8, if association of segments from a plurality of video streams is performed based on the computed summarization scores, segments having the highest summarization score can be selected. For example, first, summarization scores 801 to 803 corresponding to video streams A to C are computed. The summarization scores 801 to 803 are described that the clock time is synchronized with each other. No video is shot for the shaded portions of FIG. 8. Then, the streams are divided at points where scenes having the highest scores are changed. That is, video stream C having the highest summarization score 803 is first selected as a summarization segment, then, video stream A is selected at the point where the summarization score of video stream A becomes higher than that of video stream C. The segment of video stream C is used for segment 805, and the segment of video stream A is used for segment 806, segments 805 and 806 being summarization segments. The summarization segments 805 to 808 are obtained by repeating the above procedure. Finally, a summarized video 804 is obtained by combining the summarization segments based on the highest summarization score for each segment.

According the aforementioned first embodiment, video stream shot at the same time, even though they lack time stamps, can be associated by associating segments based on the feature values of video stream when creating the summarized video from a plurality of video clips. In addition, the important scenes can be detected by computing the summarization scores indicating the importance of the video. The first embodiment can realize a high-quality summarized video by reducing misjudgment of important scene of the event.

(Second Embodiment)

It is easy to collect video clips of a particular event that a person captured with several cameras and to manage and edit the collected video clips. However, it is not easy to collect video clips of a certain event captured by several videographers. In this embodiment, a system that a plurality of videographers (clients) transfer video clips to a server, and a summarized video is created on the server will be explained. This system can realize a high-quality summarized video by using a large number of video clips.

For the system, all structures of the video processing apparatus according to the first embodiment may be included in the server, or the structures may be separated and assigned to a plurality of devices connected to a network. If the functions are carried out by the plurality of devices, required data of video is selectively transmitted from each processing unit so that the data traffic can be advantageously reduced. For example, the clients merely may transmit, to the server, video from which certain frames have been eliminated or scaled down video. For the data having an encoded format such as MPEG, a low-resolution image generated by motion vector or low-frequency components of an image which is intra-frame encoded may be used. Only a sound feature may be used to extract the feature values. Since the size of sound feature is smaller than picture data, the data traffic can be greatly reduced by selecting segments to be transmitted by using the sound feature.

Figure 9:
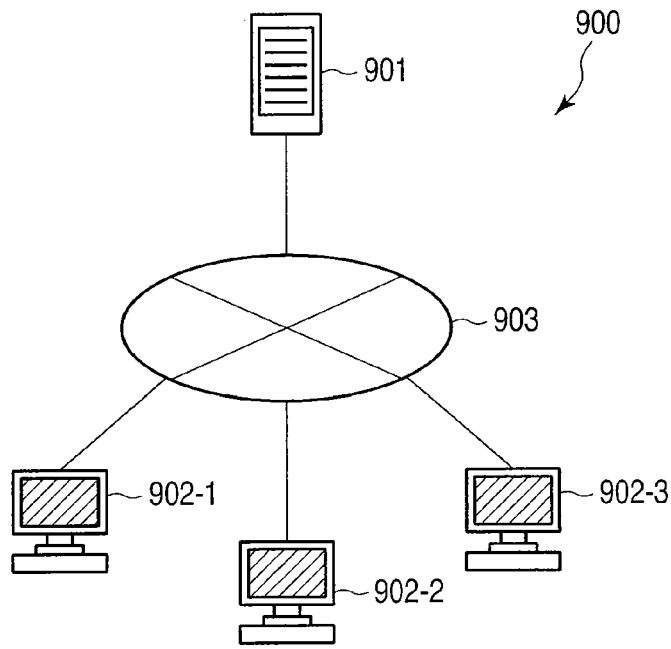
FIG. 9 illustrates a video processing system according to the second embodiment.

The video processing system according to the second embodiment will be explained with reference to FIG. 9.

The video processing system 900 includes a server 901, and clients 902-1, 902-2 and 902-3. The server 901 is connected to each client via a network 903. In the second embodiment, a single server 901 and three clients 902 are illustrated, but the numbers of servers and clients may vary. If a plurality of servers 901 are used, it is necessary to collect data required for processing at a single server.

In the second embodiment, the clients 902 include an acquisition unit 101 and an output unit 107 shown in FIG. 1, and the server 901 includes a first extraction unit 102, a generation unit 103, a second extraction unit 104, a computation unit 105, and a selection unit 106 shown in FIG. 1. The units perform the same operations as those of the first embodiment, and explanations are omitted.

The operation of the video processing system 900 will be explained with reference to the flowchart shown in FIG. 10.

In step S1001, the clients 902 acquire one or more video streams, respectively.

In step S1002, the clients 902 transmit sound data items included in the video streams to the server 901.

In step S1003, the server 901 receives the sound data items from the plurality of clients 902.

In step S1004, a first extraction unit 102 of the server 901 extracts sound features from the sound data items.

In step S1005, the generation unit 103 of the server 901 generates associated segment groups by associating segments based on the sound features extracted from the plurality of video streams. Segment association may be performed after completing reception of sound data items from all clients 902, or the segment association may be performed when sound data items are received from a predetermined number of clients 902.

In step S1006, the second extraction unit 104 of the server 901 extracts common video segment groups in the same manner as the first embodiment.

In step S1007, the server 901 transmits the common video segment groups to the clients 902. The server 901 may transmit the common video segment groups to all clients 902 or clients 902 which have transmitted sound data items to the server 901.

In step S1008, the clients 902 receive the common video segment groups, respectively.

In step S1009, the clients 902 transmit videos of the common video segment groups (referred to as segmented videos) to the server 901. The server 901 receives the segmented videos from the plurality of clients 902.

In step S1010, the server 901 receives the segmented videos from the clients 902.

In step S1011, the first extraction unit 102 of the server 901 extracts image features from the segmented videos.

In step S1012, the computation unit 105 of the server 901 computes summarization scores of segments included in the common video segment groups based on the image features. The summarization scores can be computed by combining sound features with the image features.

In step S1013, the selection unit 106 of the server 901 selects summarization segments based on the summarization scores.

In step S1014, the server 901 transmits the summarization segments to the clients 902. For example, if the summarization segments relate to video transmitted by the client 902-1, the summarization segments may include information specifying the segments or include the video. If segments transmitted from the other clients 902-2 and 902-3 are included in the summarization segments, video streams should be included in the segments. Even if video not transmitted from the clients 902 is included, if the video can be viewed, for example, by using a video sharing website, data specifying the address (URL) and the segment may be transmitted.

In step S1015, the clients 902 receive the summarization segments.

In step S1016, the output units 107 of the clients 902 output the summarization segments. The summarization segments to be output may be information specifying the segments or the video, or may be a summarized video in which video streams of the summarization segments are combined.

According to the second embodiment, a high-quality summarized video is efficiently created from a plurality of video streams by processing the video streams transmitted from a plurality of clients at a server. In addition, the data traffic between the clients and the server can be reduced by transmitting sound data item whose data size is smaller than moving picture data items when extracting the feature values.

(Third Embodiment)

Editing a same event that shot multiple cameras generally involves using a typical shot pattern, which specifies the sequence of shots constituting a routine scene. For instance, if the scene is of a toast being made, a typical shot pattern might start with a shot of someone proposing the toast and end with a shot of the gathered company applauding. The normal way to make a video based on a typical shot pattern is to set up several cameras and determine what kinds of shot to employ and how to time the shots. However, doing this is difficult for the lone amateur, so an alternative way is to use video shot from various angles by a group of amateurs. As a result, the video based on typical shot pattern can be created by combining the video shot from various angles.

The video processing apparatus according to the third embodiment will be explained with reference to the block diagram shown in FIG. 11.

A video processing apparatus 1100 according to the third embodiment includes an acquisition unit 101, a first extraction unit 102, a generation unit 103, a second extraction unit 104, a computation unit 105, a selection unit 1103, an output unit 107, a detection unit 1101, and a correction unit 1102.

The acquisition unit 101, the first extraction unit 102, the generation unit 103, the second extraction unit 104, the computation unit 105 and the output unit 107 perform the same operations as the first embodiment, and explanations are omitted.

The detection unit 1101 receives feature values from the first extraction unit 102 and receives a feature value model of typical shot patterns from a shot pattern dictionary 1104 described below. The detection unit 1101 calculates likelihood by comparing the received feature values with the feature value models of the typical shot patterns. The feature value models are prepared by modeling the feature values (image features and sound features) of video streams included in the typical shot patterns and indicates change of feature values sequentially.

The correction unit 1102 receives the likelihood values from the detection unit 1101 and generates correction values in accordance with the likelihood values.

The selection unit 1103 carries out substantially the same operation as the selection unit 106 of the first embodiment.

The selection unit 1103 receives summarization scores from the computation unit 105 and the correction values from the correction unit 1102, and selects summarization segments based on corrected summarization scores in which the correction values are added to the summarization scores.

The shot pattern dictionary 1104 stores a plurality of feature value models of typical shot patterns. The feature value models of the typical shot patterns can be generated by empirically setting parameters or through learning using statistical data. In addition, the feature value models can be obtained from external dictionaries on the Internet. The shot pattern dictionary 1104 will be explained later with reference to FIG. 13.

The operation of the video processing apparatus 1100 according to the third embodiment will be explained with reference to the flowchart shown in FIG. 12. Steps S201 to S210 are the same as those in the first embodiment, and explanations are omitted.

In step S1201, the detection unit 1101 acquires feature value models of typical shot patterns from the shot pattern dictionary 1104.

In step S1202, the detection unit 1101 compares the feature values computed in step S102 with one or more feature value models of typical shot patterns and compute likelihood of matching for each typical shot pattern. If a typical shot pattern having likelihood greater than or equal to a threshold value exists, step S1203 is executed; if not, step S109 is executed.

In step S1203, the correction unit 1102 generates values weighted by the likelihood values as correction values. The correction values are prepared to increase the summarization scores so that segments in which the correction values are added are to be selected for the summarization segments. Then, the selection unit 1103 generates corrected summarization scores by adding the correction values to the summarization scores of segments to be selected as being representative of the typical shot pattern.

An example of typical shot patterns stored in the typical shot pattern dictionary will be explained with reference to FIG. 13.

Figures 13, 14:
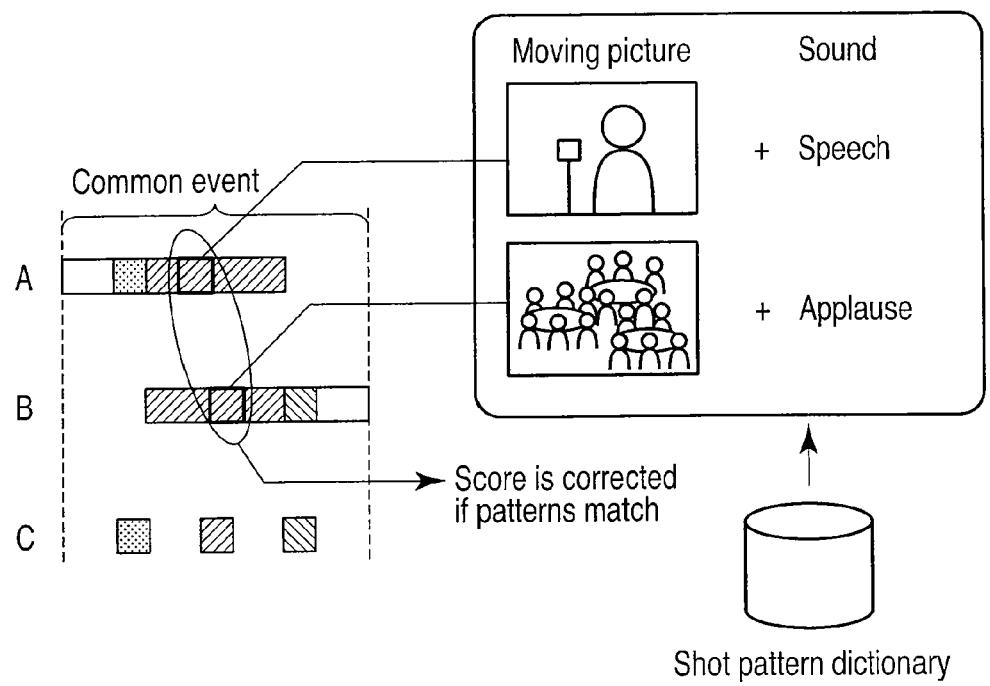
FIG. 13 illustrates an example of the typical shot patterns stored in the typical shot pattern dictionary.
FIG. 14 illustrates the processing of the detection unit and the correction unit according to the third embodiment.

As shown in FIG. 13, characteristics of each shot used in the typical shot pattern are categorized and stored. The typical shot pattern is generated by combining multiple shots according to the stored characteristics.

For instance, in a shot of someone proposing the toast, there is hardly any panning, the person being shown in close-up in the center of the screen. In a shot of the gathered company applauding, a large number of people are shown, and sometimes there is panning to take in the whole scene. The feature value model for the image features is a model including at least one of face position and size, and camera angles. The feature value model for the sound features is, in the case of the shot of proposing the toast, a model of frequency distribution of the human voice; and, in the case of the shot of applauding, a model of frequency distribution of applause.

In FIG. 13, the feature values include parameters of face count, face position, face size, camera angle and sound type, these values being stored in the shot pattern dictionary for each shot. For shot 1, which is a shot of someone proposing the toast, the face count is "One", the face position is "Center", the face size is "Large", the camera angle is "Fixed", and the sound type is "Speech". For shot 2, which is a shot of the applause, the face count is "5 or more", the face position is "Spread", the face size is "Small", the camera angle is "Pan", and the sound type is "Applause". If the feature values of a captured video include a combination of parameters reflecting the feature value models of shots 1 and 2, the video is selected as being representative of the typical shot pattern.

The feature value models do not have to include both image feature and sound feature. The feature value models can be generated for one of picture and sound features or other features. The parameters of the typical shot pattern may include a specific person identification as to the main characters of event (bride and groom), a face orientation, a mouth movement other than those indicated in FIG. 13. By using such parameters, a typical shot pattern in which someone giving a speech asks the bride and groom a question can be created.

The operation of the detection unit 1101 and the correction unit 1102 will be explained with reference to FIG. 14.
The detection unit 1101 compares the feature values computed from video streams with the feature value models of the typical shot pattern, and computes the likelihood of matching. For example, for video streams A and B associated by time, the likelihood of matching is detected by comparing, first, video stream A with the feature values of shot 1; then, video stream B with the feature values of shot 2; then, video stream A with the feature values of shot 2; and finally, video stream B with the feature values of shot 1.

After computing the likelihood for all the video streams, if a combination of shots having the highest likelihood can represent the typical shot pattern, the correction unit 1102 generates the correction values so that the shots are selected as summarization segments.

According to the third embodiment, the summarized video including the typical shot patterns is created by modeling the feature values of the typical shot pattern and combining segments of multiple video streams corresponding to the typical shot patterns even though videographers intentionally shot video streams based on the typical shot patterns.

(Fourth Embodiment)

In the first embodiment, it may be that the summarized video includes summarization segments obtained from video streams owned by other users, rather than the creator of the summarized video, and those users do not wish the creator to use their video streams. In the fourth embodiment, if video streams owned by other users are included in the summarization segments, authorization by those users is requested, and segments of the video streams are changed so as to exclude from the summarization segments if authorization is denied. This realizes a summarized video which fulfills users' intentions.

Figure 15:
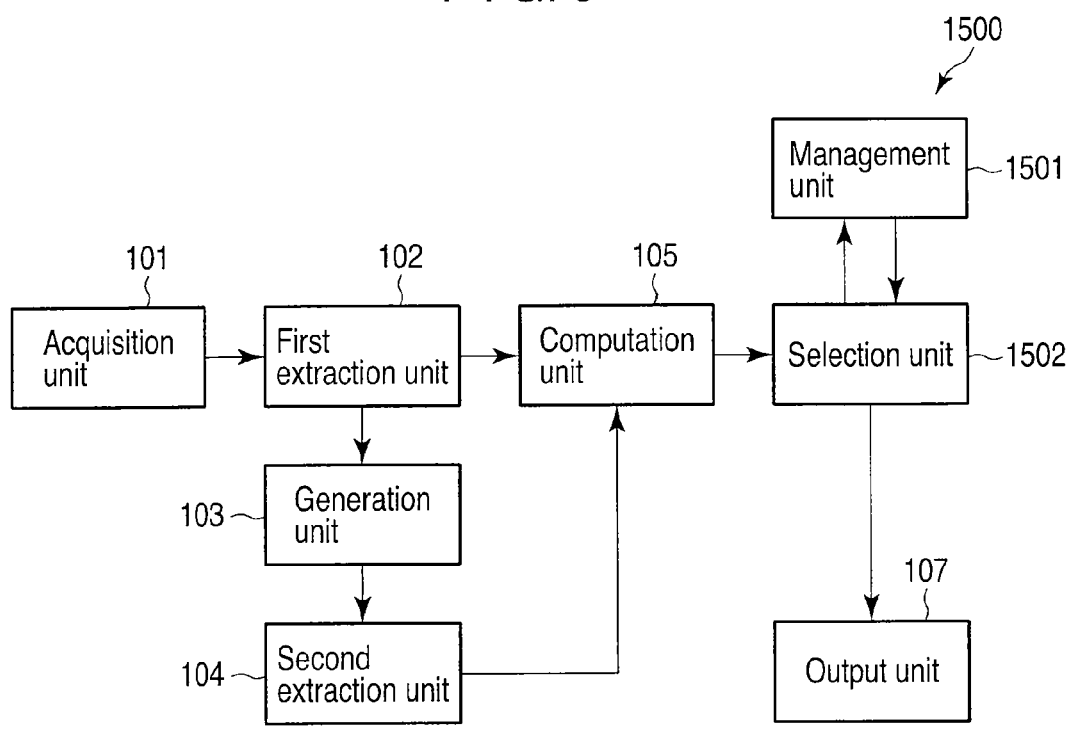
FIG. 15 is an exemplary block diagram illustrating a video processing apparatus according to the fourth embodiment.

The video processing apparatus according to the fourth embodiment will be explained with reference to the block diagram shown in FIG. 15.

A video processing apparatus 1500 according to the fourth embodiment includes an acquisition unit 101, a first extraction unit 102, a generation unit 103, a second extraction unit 104, a computation unit 105, a selection unit 1502, an output unit 107 and a management unit 1501.

The acquisition unit 101, the first extraction unit 102, the generation unit 103, the second extraction unit 104, the computation unit 105 and the output unit 107 carry out the same operations as the first embodiment, and explanations are omitted.

Videos used in this embodiment include authorization information item indicating authorization to use by other users (for example, an information item as to whether or not other users can use the video streams for a summarized video).

The management unit 1501 receives summarization segments from the selection unit 1502 described below, and determines whether or not the segments included in the summarization segments are authorized or unauthorized based on authorization information item. The authorized segments are segments whose authorization information item indicates "OK," and the unauthorized segments are segments whose authorization information item indicates "NO." The management unit 1501 requests authorization to the users owning unauthorized segments.

The selection unit 1502 performs substantially the same operation as the selection unit 106 according to the first embodiment. However, if unauthorized segments are included in the summarization segments, the selection unit 1502 eliminates the unauthorized segments or selects the segments of the common video segment groups having the second highest summarization scores as the summarization segments.

Figure 16:
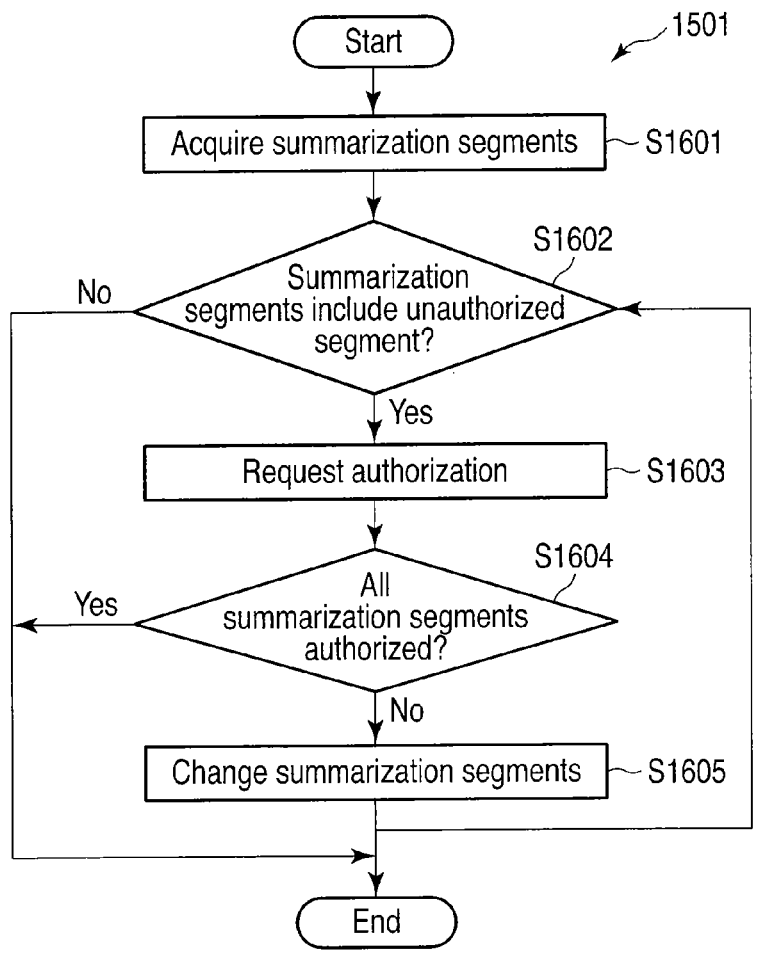
FIG. 16 is an exemplary flowchart illustrating the operation of the management unit and the selection unit.

The operations of the management unit 1501 and the selection unit 1502 will be explained with reference to the flowchart shown in FIG. 16.

In step S1601, the management unit 1501 acquires summarization segments from the selection unit 1502.

In step S1602, the management unit 1501 determines whether or not unauthorized segments are included in the summarization segments. If the unauthorized segments are included, step S1603 is executed; if unauthorized segments are not included, the processing is terminated without making any change to the summarization segments.

In step S1603, the management unit 1501 requests authorization from users who own unauthorized segments. Instead of explicitly displaying a message for requesting authorization, the management unit 1501 may automatically determine authorization based on a user's registration information, or a user's permission to use video streams within a community, or the range of video content authorized for public viewing on the social network service (SNS) with which the user is registered. In addition, the management unit 1501 may display a message indicating "Unauthorized segments are included in the summarization segments. Do you want to request authorization from the owners?" to enable the creator of the summarized video to obtain authorization without directly requesting authorization from owners. Authorization can be requested through the server without specifying the owners, instead of directly between creator and owners.

In step S1604, it is determined whether or not all segments of the summarization segments are authorized to be used. If all segments are authorized to be used, the processing is terminated without making any change in the summarization segments. If there is a segment not allowed to be used, step S1605 is executed.

In step S1605, the summarization segments are changed not to include unauthorized segments. The summarization segments are changed by eliminating the unauthorized segments or decreasing the summarization scores of the unauthorized segments and allowing the other segments to be selected. Then, step S1602 is returned to in order to apply the same processing to the newly selected segments. The processing is repeated until all summarization segments are authorized to be used.

According to the fourth embodiment, if segments owned by other users are included in the summarization segments, the summarization segments are changed to exclude such segments when the users' authorization cannot be obtained. This realizes generation of a summarized video which fulfills users' intentions.

(Fifth Embodiment)

The fifth embodiment is for a case where multiple users store video streams captured with their respective cameras on a common server, for example. If users A and B have video clips of the same event, user A is informed that user B, who is on the same server, attended the same event, and vice versa. This realizes provision of information which users are interested in, such as other users who share a common interest or communities of interest.

Figure 17:
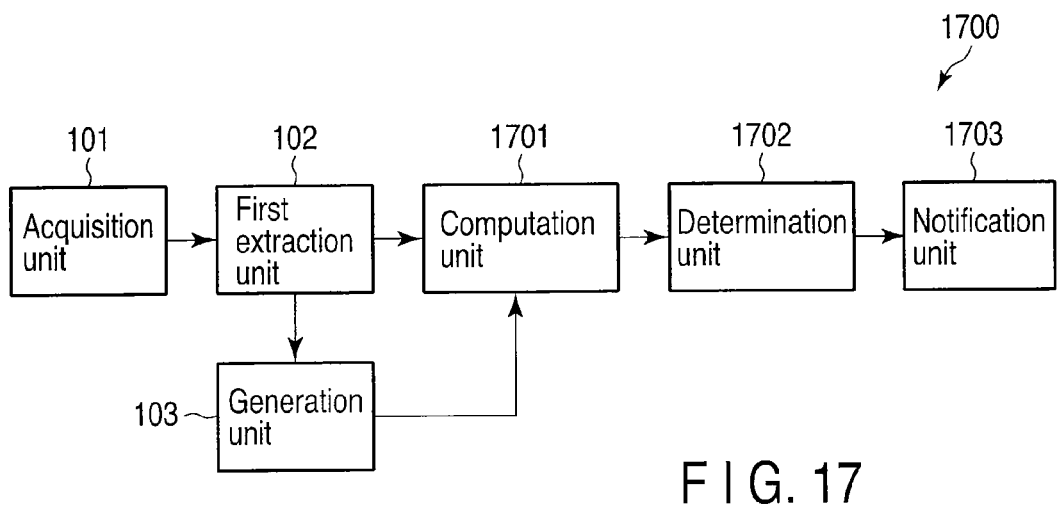
FIG. 17 is an exemplary block diagram illustrating a video processing apparatus according to the fifth embodiment.

The video processing apparatus according to the fifth embodiment will be explained with reference to the block diagram shown in FIG. 17.

A video processing apparatus 1700 according to the fifth embodiment includes an acquisition unit 101, a first extraction unit 102, a generation unit 103, a computation unit 1701, a determination unit 1702, and a notification unit 1703.

The acquisition unit 101, the first extraction unit 102 and the generation unit 103 perform the same operations as the first embodiment, and explanations are omitted.

The computation unit 1701 receives a plurality of associated segment groups from the generation unit 103, and computes user relevance scores. The user relevance scores indicate relevance between users having input video streams. The higher score indicates that the users are highly related. The user relevance score may be the length of associated segments. The distance between feature values or the similarity of feature values computed for segment association can be used as the user relevance score even though actual segment association is not made.

The determination unit 1702 receives the user relevance scores from the computation unit 1701, and determines whether or not users whose user relevance scores are greater than or equal to a threshold value exist. The determination unit 1702 determines whether or not a permit notification for the users having the user relevance scores greater than or equal to the threshold value exists.

The notification unit 1703 receives the determination results from the determination unit 1702, and notifies the users in accordance with the determination results.

Figure 18:
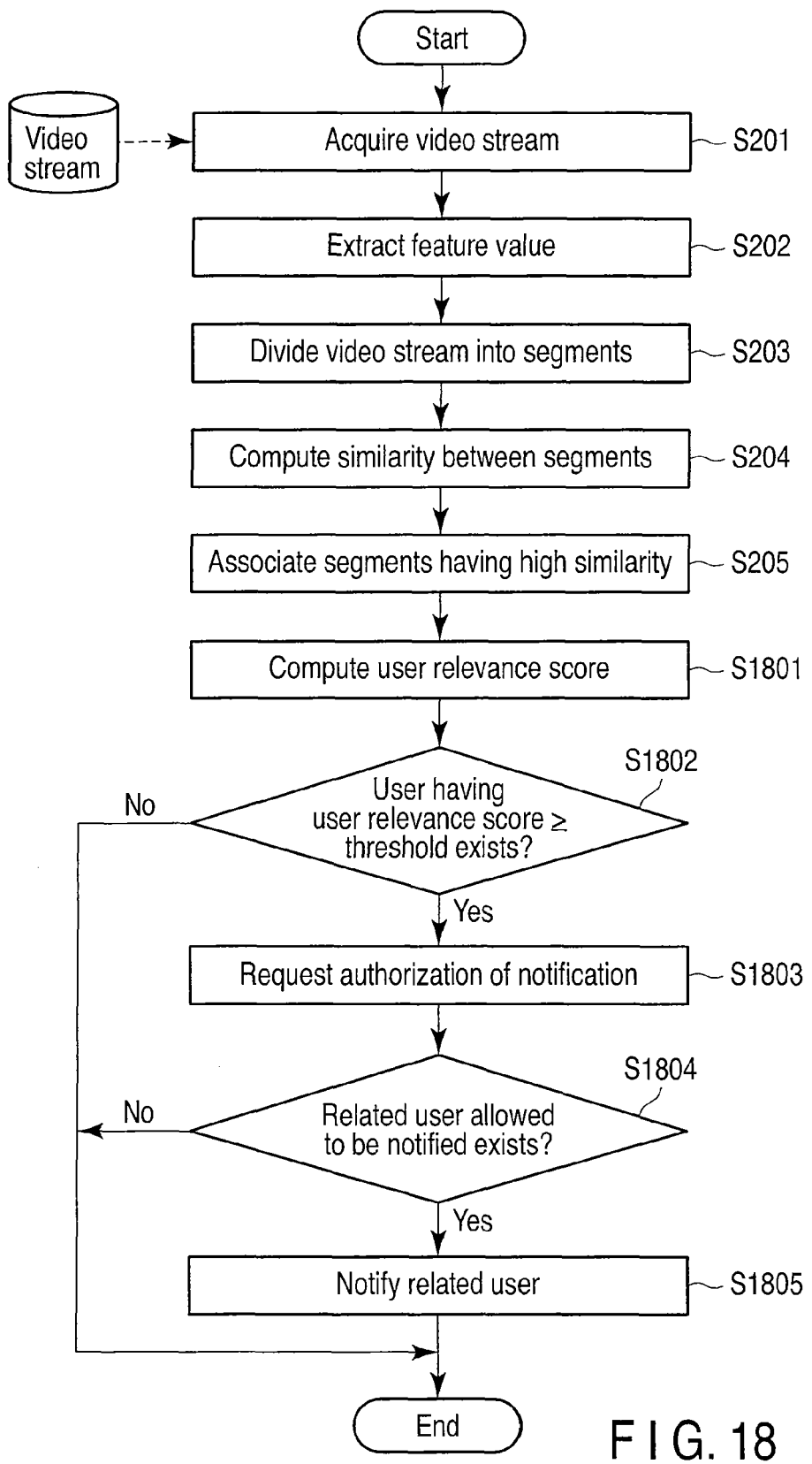
FIG. 18 is an exemplary flowchart illustrating the operation of the video processing apparatus according to the fifth embodiment.

The operation of the video processing apparatus 1700 according to the fifth embodiment will be explained with reference to the flowchart shown in FIG. 18.

Steps S201 to S205 are the same as those of the first embodiment, and explanations are omitted.

In step S1801, the computation unit 1701 computes user relevance scores for the associated segment groups.

In step S1802, the determination unit 1702 determines whether or not users whose user relevance scores are greater than or equal to a threshold value exist. If there is no user having user relevance score greater than or equal to the threshold value, the processing is terminated. If there are users having user relevance scores greater than or equal to the threshold value, step S1803 is executed.

In step S1803, the notification unit 1703 requests a user (user A) authorization of notifying the related user (user B) that user A is a related user.

For requesting authorization, for example, a message is displayed to user A, and user A replies by inputting acceptance or refusal. For a case where there are multiple related users, authorization may be asked to user A relative to each related user.

In step S1804, the notification unit 1703 determines whether there is a related user allowed to be notified. This determination is made, for example, base on whether the user allows notification to the related user in step S1803. If there is a related user allowed to be notified, step S1805 is executed; if not, the processing is terminated.

In step S1805, the notification unit 1703 performs notification to the related user. The operation of the video processing apparatus 1700 is completed.

When obtaining authorization from user B, that user is asked whether or not user A should be notified that user B is a related user. Authorization is obtained, for example, by displaying a message to user B and inputting user B's acceptance or refusal. Since users A and B are not always online at the same time, authorization may be obtained by email. If there is more than one related user, not all the users may respond immediately. In this case, a periodic check is made of whether there is a related user to be notified, and notification may be given when such a related user is found.

Further, if user A allows notification to the related user (user B) anytime, notification can be given to the related user, and the related user may be asked whether or not to access user A. For example, the notification unit 1703 sends the message "There is a new related user. Do you want to access the user?" to user B, and user B inputs whether to accept or not. If user B responds with "Yes," user B can access related user A.

In SNS, a community is created where users share common interests, and those users communicate with each other, via email or blogs and so on, within the community. Because the relevance between the users in the community should be high, the notification unit 1703 can invite users to a highly related community. In addition, if a user does not know whether a related community exists within the service, the user can search for a community based on the user's own video streams and community relevance scores.

The community relevance score is an average of the user relevance scores within a community, a total number of related users or a ratio of related users to all users, for example.

The fifth embodiment realizes providing information related to the users' interests such as users sharing a common interest or communities of interest, based on the user relevance scores.

In the above embodiments, the processing is explained with reference to video streams, but it is also applicable to still pictures. For still pictures taken at very short intervals, for example one to dozens or more of pictures per second, the same processing as for movies extracted frame-by-frame can be executed by using image features. For pictures taken at general intervals, the same processing can be performed associated pictures by clustering the pictures according to time and computing similarities between pictures based on image features.

The flowcharts of the embodiments illustrate methods according to the embodiments. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video processing apparatus, comprising:
an acquisition unit configured to acquire a plurality of video streams each including moving picture data items and sound data items;
a first extraction unit configured to analyze at least one of the moving picture data items and the sound data items for each video stream, and to extract a feature value from the analyzed one, the feature value indicating a common feature between the plurality of video streams;
a generation unit configured to generate a plurality of segments by dividing each of the video streams in accordance with change in the feature value, and to generate associated segment groups by associating a plurality of segments between different video streams, each associated segment included in the associated segment groups having a similarity of feature value between the segments greater than or equal to a first threshold value;
a second extraction unit configured to extract, from the associated segment groups, one or more common video segment groups in which number of associated segments is greater than or equal to a second threshold value, the number of the associated segments being number of different video streams each including the associated segment which corresponds each of the associated segment groups;
a computation unit configured to compute a summarization score indicating a degree of suitability for including a segment of the common video segment group in a summarized video created from a part of the video streams, the summarization score varying with time and being based on the feature value extracted at least one of the moving picture data items and the sound data items;
a selection unit configured to select summarization segments to be used for the summarized video from the common video segment groups based on the summarization score;
a detection unit configured to compute likelihood of matching the feature value with feature value models of typical shot patterns indicating a combination of shots creating a predetermined scene, and to detect the feature value in which the likelihood is greater than or equal to a third threshold value; and
a correction unit configured to generate correction value for the summarization score computed from the feature value in which the likelihood is greater than or equal to the third threshold value, wherein the selection unit selects the summarization segments based on the summarized score in which the correction values are added.

2. The apparatus according to claim 1, wherein the generation unit is configured to generate the associated segment groups in accordance with the feature value of the sound data items, and the computation unit is configured to compute the summarization score at least based on the feature value of the moving picture data items.

3. A video processing apparatus, comprising:
an acquisition unit configured to acquire a plurality of video streams each including moving picture data items and sound data items;
a first extraction unit configured to analyze at least one of the moving picture data items and the sound data items for each video stream, and to extract a feature value from the analyzed one, the feature value indicating a common feature between the plurality of video streams;
a generation unit configured to generate a plurality of segments by dividing each of the video streams in accordance with change in the feature value, and to generate associated segment groups by associating a plurality of segments between different video streams, each associated segment included in the associated segment groups having a similarity of feature value between the segments greater than or equal to a first threshold value;
a second extraction unit configured to extract, from the associated segment groups, one or more common video segment groups in which number of associated segments is greater than or equal to a second threshold value, the number of the associated segments being number of different video streams each including the associated segment which corresponds each of the associated segment groups;
a computation unit configured to compute a summarization score indicating a degree of suitability for including a segment of the common video segment group in a summarized video created from a part of the video streams, the summarization score varying with time and being based on the feature value extracted at least one of the moving picture data items and the sound data items; and
a selection unit configured to select summarization segments to be used for the summarized video from the common video segment groups based on the summarization score, wherein the video streams include authorization information items indicating whether or not the video streams are authorized to be used, respectively, the apparatus further comprising a management unit configured to request authorization to users owning the video streams if the selected summarization segments are unauthorized, wherein the selection unit is configured to eliminate the summarization segments which are unauthorized to be used or select the authorized segments as the summarization segments.

4. A video processing apparatus, comprising:
an acquisition unit configured to acquire a plurality of video streams each including moving picture data items and sound data items;
a first extraction unit configured to analyze at least one of the moving picture data items and sound data items for each video streams, and to extract a feature value from the analyzed one, the feature value indicating a common feature between the plurality of video streams;
a generation unit configured to generate a plurality of segments by dividing each of the video streams in accordance with change in the feature value, and to generate associated segment groups by associating a plurality of segments between the different video streams, each associated segment included in the associated segment groups having a similarity of feature value between the segments greater than or equal to a first threshold value;

a computation unit configured to compute a user relevant score indicating high relevance between users who own the associated segment groups having high similarity for each of the users;

a decision unit configured to decide whether or not the user relevant score is greater than or equal to a fourth threshold value;

a notification unit configured to send a message to the users each having the user relevant score greater than or equal to the fourth threshold value; and a selection unit configured to select summarization segments to be used for the summarized video from the common video segment groups based on the summarization score, wherein the video streams include authorization information items indicating whether or not the video streams are authorized to be used, respectively, the apparatus further comprising a management unit configured to request authorization to users owning the video streams if the selected summarization segments are unauthorized, wherein the selection unit is configured to eliminate the summarization segments which are unauthorized to be used or select the authorized segments as the summarization segments.

5. The apparatus according to claim 4, wherein in a case where a plurality of communities in which a plurality of users join exist, the notification unit is configured to send a message relating to the communities if the user relevant score are greater than or equal to a community relevant score computed from the user relevant score of the users belonging to the communities.

6. A video processing apparatus, comprising:

a receiving unit configured to receive a plurality of sound data items from a plurality of video streams each including moving picture data items and sound data items;

a first extraction unit configured to analyze the sound data items and to extract first feature value, the first feature value representing feature of sound data items and indicating common feature between the plurality of sound data items;

a generation unit configured to generate a plurality of segments by dividing each of the sound data items in the video streams in accordance with change in the first feature value, and to generate associated segment groups by associating a plurality of segments of different sound data items in the video stream, each associated segment included in the associated segment groups having a similarity of first feature value between the segments greater than or equal to a first threshold value;

a second extraction unit configured to extract, from the associated segment groups, one or more common video segment groups in which number of segments is greater than or equal to a second threshold value, the number of the associated segments being number of different sound data items in the video streams each including the associated segment which corresponds each of the associated segment groups, wherein the receiving unit receives moving picture data items of the common video segment groups, and the first extraction unit extracts second feature value, the second feature value representing features of moving picture data items and indicating common features between the plurality of moving picture data items included in the common video segment groups, a computation unit configured to compute a summarization score indicating a degree of suitability for including each segment of the common video segment groups in a summarized video created from a part of the video streams, the summarization score varying with time and being based on the second feature value;

a selection unit configured to select summarization segments to be used for the summarized video from the common video segment groups based on the summarization score;

a detection unit configured to compute likelihood of matching the feature value with feature value models of typical shot patterns indicating a combination of shots creating a predetermined scene, and to detect the feature value in which the likelihood is greater than or equal to a third threshold value; and a correction unit configured to generate correction value for the summarization score computed from the feature value in which the likelihood is greater than or equal to the third threshold value, wherein the selection unit selects the summarization segments based on the summarized score in which the correction values are added.

7. A video processing system comprising at least one client each comprising a first transmission/receiving unit and a server comprising a second transmission/receiving unit and operable to communicate with the client, the client further comprising:

an acquisition unit configured to acquire a plurality of video streams including moving picture data items and sound data items, the first transmission/receiving unit of the client transmitting the sound data items;

the second transmission/receiving unit of the server receiving the sound data items;

the server further comprising:

a first extraction unit configured to analyze the sound data items and to extract first feature values, the first feature values representing features of sound data items and indicating common features between the sounds;

a generation unit configured to generate a plurality of segments by dividing each of the video streams in accordance with change in the first feature values, and to generate associated segment groups by associating a plurality of segments between different video streams, each associated segment included in the associated segment groups having a similarity of feature value between the segments greater than or equal to a first threshold value; and a second extraction unit configured to extract, from the associated segment groups, one or more common video segment groups in which a number of associated segments is greater than or equal to a second threshold value, the number of different video streams each including the associated segment which corresponds each of the associated segment groups, the second transmission/receiving unit of the server transmitting the common video segment groups, the first transmission/receiving unit of the client receiving the common video segment groups and transmitting moving picture data items included in the common video segment groups, the second transmission/receiving unit of the server receiving the moving pictures included in the common video segment groups, the first extraction unit extracting second feature value, the second feature values representing feature of moving picture data items and indicating common features between the moving picture data items included in the common video segment groups, the server further comprising:

a computation unit configured to compute a summarization score indicating a degree of suitability for including each segment of the common video segment groups in a summarized video created from a part of the video streams, the summarization score varying with time and being based on the second feature value;

a selection unit configured to select summarization segments to be used for the summarized video from the common video segment groups based on the summarization score;

a detection unit configured to compute likelihood of matching the feature value with feature value models of typical shot patterns indicating a combination of shots creating a predetermined scene, and to detect the feature value in which the likelihood is greater than or equal to a third threshold value; and correction unit configured to generate correction value for the summarization score computed from the feature value in which the likelihood is greater than or equal to the third threshold value, wherein the selection unit selects the summarization segments based on the summarized score in which the correction values are added, the second transmission/receiving unit of the server transmitting the summarization segments.

8. A video processing apparatus, comprising:

an acquisition unit configured to acquire at least one still picture group each including a plurality of still pictures;

a first extraction unit configured to analyze the still picture group and to extract feature values, the feature values indicating a common feature between the plurality of still picture groups;

a generation unit configured to generate associated still picture groups by associating a plurality of still pictures, each associated segment included in the associated still picture groups having a similarity of a feature value between the still pictures within each still picture group greater than or equal to a first threshold value;

a second extraction unit configured to extract, from the associated still picture groups, one or more common still picture groups in which number of associated still pictures is greater than or equal to a second threshold value;

a computation unit configured to compute a summarization score indicating a degree of suitability for including a segment of the common still picture group in a summarized still picture created from a part of the still pictures, the summarization score varying with time and being based on the feature value of the common still picture groups;

a selection unit configured to select still pictures to be used for the summarized still picture from the common still picture groups based on the summarization score;

a detection unit configured to compute likelihood of matching the feature value with feature value models of typical shot patterns indicating a combination of shots creating a predetermined scene, and to detect the feature value in which the likelihood is greater than or equal to a third threshold value; and a correction unit configured to generate correction value for the summarization score computed from the feature value in which the likelihood is greater than or equal to the third threshold value, wherein the selection unit selects the summarization segments based on the summarized score in which the correction values are added.

9. A video processing method, comprising:

acquiring a plurality of video streams each including moving picture data items and sound data items;

analyzing at least one of the moving picture data items and the sound data items for each video stream, extracting a feature value from the analyzed one, the feature value indicating a common feature between the plurality of video streams;

generating a plurality of segments by dividing each of the video streams in accordance with change in the feature value, and to generate associated segment groups by associating a plurality of segments of between different video streams, each associated segment included in the associated segment groups having a similarity of feature value between the segments greater than or equal to a first threshold value;

extracting, from the associated segment groups, one or more common video segment groups in which number of the associated segments is greater than or equal to a second threshold value, the number of the associated segments being number of different video streams each including the associated segment which corresponds each of the associated segment groups;

computing a summarization score indicating a degree of suitability including a segment of the common video segment group in a summarized video created from a part of the video streams, the summarization score varying with time and being based on the feature value extracted at least one of the moving picture data items and the sound data items;

selecting summarization segments to be used for the summarized video from the common video segment groups based on the summarization score;

computing a likelihood of matching the feature value with feature value models of typical shot patterns indicating a combination of shots creating a predetermined scene;

detecting the feature value in which the likelihood is greater than or equal to a third threshold value;

generating a correction value for the summarization score computed from the feature value in which the likelihood is greater than or equal to the third threshold value; and selecting the summarization segments based on the summarized score in which the correction values are added.

* * * * *

UNITED STATES PATENT AND TRADEMARK OFFICE
CERTIFICATE OF CORRECTION

| | | |
|---|---|---|
| PATENT NO. | : 8,879,788 B2 | Page 1 of 1 |
| APPLICATION NO. | : 13/240278 | |
| DATED | : November 4, 2014 | |
| INVENTOR(S) | : Yamamoto et al. | |

It is certified that error appears in the above-identified patent and that said Letters Patent is hereby corrected as shown below:

On The Title Page, under "Assignee":

Item (73) – please correct: "Kabushiki, Kaisha Toshiba" to -- Kabushiki Kaisha Toshiba, Minato-ku, Tokyo (JP) --.

Signed and Sealed this
Tenth Day of February, 2015

Michelle K. Lee
*Deputy Director of the United States Patent and Trademark Office*